US010809475B2

United States Patent
Bringuier et al.

(10) Patent No.: US 10,809,475 B2
(45) Date of Patent: Oct. 20, 2020

(54) JACKET FOR A FIBER OPTIC CABLE

(71) Applicant: Corning Optical Communications LLC, Hickory, NC (US)

(72) Inventors: Anne Germaine Bringuier, Taylorsville, NC (US); Warren Welborn McAlpine, Hickory, NC (US); Brandon Robert Williamson, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 666 days.

(21) Appl. No.: 14/631,149

(22) Filed: Feb. 25, 2015

(65) Prior Publication Data

US 2015/0268430 A1    Sep. 24, 2015

Related U.S. Application Data

(60) Provisional application No. 61/954,831, filed on Mar. 18, 2014.

(51) Int. Cl.
*G02B 6/44*    (2006.01)
(52) U.S. Cl.
CPC .............. *G02B 6/443* (2013.01); *G02B 6/441* (2013.01); *G02B 6/4434* (2013.01)
(58) Field of Classification Search
CPC ................................ G02B 6/443; G02B 6/4434
See application file for complete search history.

(56) References Cited

U.S. PATENT DOCUMENTS

| | | | | |
|---|---|---|---|---|
| 3,574,644 | A * | 4/1971 | Olstowski et al. ...... | C08K 9/02 106/16 |
| 3,879,518 | A * | 4/1975 | Ney ..................... | B29C 47/027 174/113 R |
| 4,109,099 | A * | 8/1978 | Dembiak ............... | H01B 7/292 174/107 |
| 4,134,953 | A * | 1/1979 | Dembiak ............... | H01B 7/292 156/54 |
| 4,730,894 | A * | 3/1988 | Arroyo ................. | G02B 6/4411 385/111 |

(Continued)

FOREIGN PATENT DOCUMENTS

| | | | | |
|---|---|---|---|---|
| CA | 2720945 A1 | 9/2015 | ............... | H01B 7/04 |
| CN | 102017019 A | 4/2011 | ............... | H01B 7/04 |

(Continued)

OTHER PUBLICATIONS

Nauta, Warner J.,Chapter 1 of Stabilisation of Low Density, Closed Cell Polyethylene Foam, Proefschrift, Universiteit Twente, 2000, available at http://doc.utwente.nl/9381/1/t000001c.pdf.*

(Continued)

*Primary Examiner* — Peter Radkowski
(74) *Attorney, Agent, or Firm* — William D. Doyle

(57) ABSTRACT

A fiber optic cable includes a core and a jacket surrounding the core. The jacket includes a base layer formed from a foamed material including a polymer. A surface layer of the jacket is formed from a second composition that differs from the first composition and also includes the polymer. An interface bonds the surface and base layers to one another.

20 Claims, 1 Drawing Sheet

(56) References Cited

U.S. PATENT DOCUMENTS

| | | | | |
|---|---|---|---|---|
| 4,941,729 | A * | 7/1990 | Hardin | G02B 6/443 174/107 |
| 4,976,519 | A * | 12/1990 | Davey | G02B 6/4438 385/102 |
| 5,001,304 | A * | 3/1991 | Hardin | G02B 6/443 174/107 |
| 5,173,961 | A * | 12/1992 | Chiasson | G02B 6/443 385/112 |
| 5,241,618 | A * | 8/1993 | Gould | D07B 1/147 385/139 |
| 5,388,175 | A * | 2/1995 | Clarke | G02B 6/4401 385/100 |
| 5,882,776 | A * | 3/1999 | Bambara | B32B 5/18 156/79 |
| 5,978,536 | A * | 11/1999 | Brandi | G02B 6/441 385/102 |
| 6,183,814 | B1 * | 2/2001 | Nangeroni | C09D 167/04 427/361 |
| 6,210,802 | B1 * | 4/2001 | Risch | G02B 6/4401 428/372 |
| 6,221,928 | B1 * | 4/2001 | Kozma | C08F 255/00 521/134 |
| 6,377,738 | B1 * | 4/2002 | Anderson | G02B 6/4433 385/100 |
| 6,504,980 | B1 | 1/2003 | Gaillard et al. | 385/112 |
| 6,605,652 | B1 * | 8/2003 | Stone | C09D 11/101 523/160 |
| 6,744,954 | B1 * | 6/2004 | Tanaka | G02B 6/4427 385/113 |
| 6,898,354 | B2 | 5/2005 | Kim et al. | 385/100 |
| 6,912,347 | B2 * | 6/2005 | Rossi | G02B 6/4438 385/112 |
| 7,225,533 | B2 * | 6/2007 | Sylvia | G02B 6/4464 254/134.3 CL |
| 7,873,249 | B2 | 1/2011 | Kachmar et al. | 385/102 |
| 8,119,916 | B2 | 2/2012 | Caccia | 174/110 R |
| 8,261,441 | B1 * | 9/2012 | Carlsten | H02G 1/16 29/825 |
| 8,541,059 | B2 * | 9/2013 | Aklian | C08G 18/4063 106/287.23 |
| 8,618,418 | B2 * | 12/2013 | Amato | H01B 7/1875 174/106 R |
| 8,620,124 | B1 | 12/2013 | Blazer et al. | |
| 2002/0126970 | A1 * | 9/2002 | Anderson | G02B 6/4433 385/113 |
| 2004/0037522 | A1 | 2/2004 | Sutehall et al. | |
| 2005/0045368 | A1 | 3/2005 | Keogh | 174/120 |
| 2005/0281517 | A1 | 12/2005 | Wessels, Jr. et al. | |
| 2009/0068366 | A1 * | 3/2009 | Aklian | C08G 18/4063 427/385.5 |
| 2009/0068453 | A1 * | 3/2009 | Chung | B32B 27/08 428/337 |
| 2009/0074364 | A1 * | 3/2009 | Bringuier | G02B 6/02357 385/103 |
| 2009/0317039 | A1 * | 12/2009 | Blazer | G02B 6/443 385/107 |
| 2009/0324180 | A1 | 12/2009 | Kachmar et al. | 385/100 |
| 2010/0048796 | A1 * | 2/2010 | Prejean | C08L 23/08 524/502 |
| 2010/0276179 | A1 * | 11/2010 | Amato | H01B 7/1875 174/113 R |
| 2011/0194825 | A1 * | 8/2011 | Parris | G02B 6/4486 385/109 |
| 2011/0225814 | A1 * | 9/2011 | Amato | H01B 7/1875 29/828 |
| 2011/0286706 | A1 * | 11/2011 | Greenwood, III | G02B 6/4495 385/107 |
| 2011/0303487 | A1 | 12/2011 | Caccia | 182/141 |

FOREIGN PATENT DOCUMENTS

| | | | | |
|---|---|---|---|---|
| CN | 102017019 B | | 3/2012 | H01B 7/04 |
| EP | 0157610 A2 | | 9/1985 | |
| EP | 157610 A2 | | 10/1985 | |
| EP | 0157610 A2 | | 10/1985 | |
| EP | 0296836 A1 | | 12/1988 | |
| EP | 296836 A1 | | 12/1988 | |
| EP | 0947868 A2 | | 10/1999 | |
| EP | 947868 A2 | | 10/1999 | |
| EP | 1085359 A2 | | 3/2001 | |
| EP | 1243957 B1 | | 4/2010 | G02B 6/44 |
| EP | 2312359 A1 | | 4/2011 | |
| IN | 201002002 P3 | | 4/2011 | H01B 7/04 |
| JP | 08218286 A | * | 8/1996 | |
| JP | 2001348544 A | * | 12/2001 | |
| MX | 2010011741 A | | 11/2010 | H01B 7/04 |
| WO | WO 02/074843 A2 | * | 9/2002 | |
| WO | WO 2010/104538 A1 | | 9/2010 | H01B 7/04 |

OTHER PUBLICATIONS

Corning Brochure, https://www.corning.com/media/worldwide/coc/documents/products/minixtend/MinXtend_Brochure_LAN-2093-AEN.pdf.*

Patent Cooperation Treaty, International Search Report for PCT/US2015/020121, dated Jul. 29, 2015, 18 pages.

Patent Cooperation Treaty, Invitation to Pay Additional Fees and, Where Applicable, Protest Fee for PCT/US2015/020121, dated May 20, 2015, 5 pages.

* cited by examiner

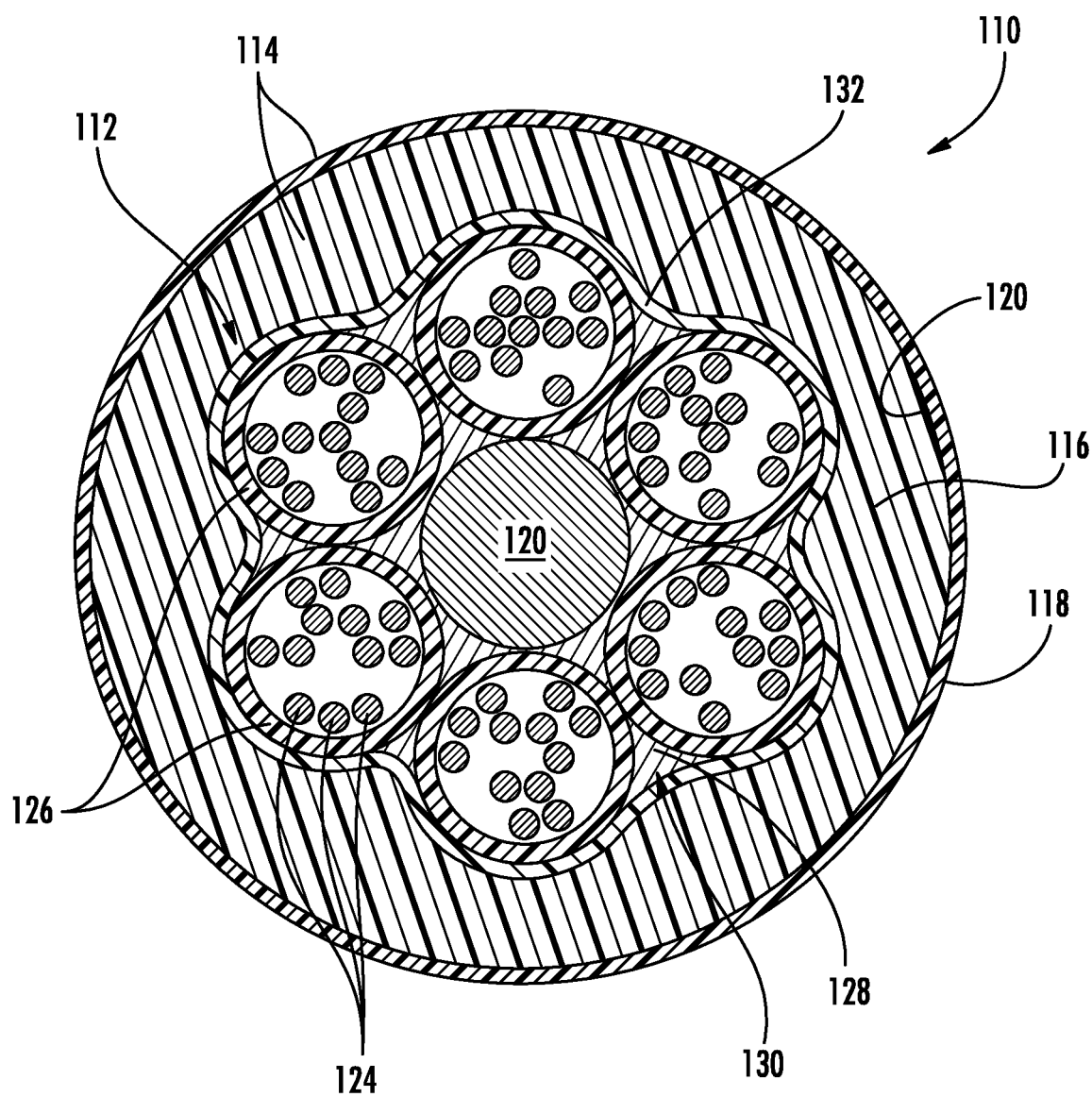

JACKET FOR A FIBER OPTIC CABLE

RELATED APPLICATIONS

This application claims priority to U.S. Provisional Patent Application No. 61/954,831 filed Mar. 18, 2014, the content of which is incorporated herein by reference in its entirety.

BACKGROUND

Aspects of the present disclosure relate generally to fiber optic cables, and more specifically to jackets or sheathing of such cables.

Fiber optic cable jackets surround and protect core components of the cable and are typically formed from polymers, such as polyethylene for outdoor jackets and polyvinyl chloride or low-smoke-zero-halogen materials for indoor jackets. In combination with other structure of cables, cable jackets may provide robustness to fiber optic cables. For example, cables with thick, stiff jackets tend to better resist to compressive loading than those with thin, flexible jackets. However, stiffness can hinder use of such cables in the field because routing the cables around tight bends and compressing such cables in narrow ductwork may be particularly difficult or result in poor performance of the cables in terms of facilitating optical communications due to high attenuation losses. A need exists for a fiber optic cable that is relatively flexible, yet still performs well, in terms of facilitating optical communications, when the cable is in bending and/or undergoing compressive loads.

SUMMARY

The present technology relates a fiber optic cable that may reduce buffer tube deflection and associated optical fiber attenuation when the cable is in compression or bending.

Some embodiments relate to a fiber optic cable that includes a core and a jacket surrounding the core. The jacket includes a base layer formed from a foamed material including a polymer. The foamed material of the base layer cushions the cable core upon receipt of compression forces and/or limits transfer of compression load to the core, such as load from a GR-20 compression test. The surface layer is formed from a second composition that differs from the first composition and also includes the polymer. The surface layer is not foamed, and instead provides a sturdy, environmental barrier (e.g., low-friction, scratch-resistant, ultraviolet light blocking). An interface cohesively bonds the surface and base layers to one another at least in part due to molecular chain entanglement of the polymer of both the first and second compositions at the interface. As such, the jacket layers act as one unit since the polymers in each layer are intrinsically compatible with each other and therefore have excellent bond strength.

In some embodiments, the cable may include a bedding compound around the core and filling the interstices between the buffer tubes, which may further strengthen the core and isolate the core from compression and bending loads, which may instead be absorbed by the foamed material.

In some embodiments, a binding layer surrounds the core and holds components of the core (e.g., buffer tubes, strength elements) tightly packed in the core of the cable, which increases friction between the core components and which increases overall tightness of the core to minimize deflection of the core components and to therefore minimize attenuation of optical fibers of the cable due to loading of the core.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying FIGURE is included to provide a further understanding, and is incorporated in and constitutes a part of this specification. The drawing illustrates one or more embodiments, and together with the Detailed Description serves to explain principles and operations of the various embodiments. As such, the disclosure will become more fully understood from the following Detailed Description, taken in conjunction with the accompanying FIGURE, in which:

FIG. 1 is a cross-sectional view of a fiber optic cable according to an exemplary embodiment.

DETAILED DESCRIPTION

Referring to FIG. 1, a fiber optic cable, in the form of a loose tube cable 110, includes a core 112 and a jacket 114 surrounding the core 112. The jacket 114 includes a base layer 116, a surface layer 118 defining a surface (e.g., exterior, interior) of the fiber optic cable 110, and an interface 120 between the surface and base layers 118, 116. According to an exemplary embodiment, the core 112 includes a strength element, such as a central strength member 122, tensile yarn (e.g., aramid, fiberglass), or stranded steel wires. The central strength member 122 may be in the form of a rod and may include glass-reinforced plastic, which is dielectric, or other materials. The core 112 includes one or more optical fibers 124, which may be loosely positioned in a tubular element(s), such as buffer tubes 126, which may be stranded around the central strength member 122 or otherwise positioned in the core 112.

According to an exemplary embodiment, the buffer tubes 126 may be primarily formed from a polymer or polymers, such as polypropylene, polycarbonate, and/or polybutylene terephthalate. In some embodiments, the polymer may be a filled polymer, such as including inorganic filler. In some embodiments, the buffer tubes 126 are generally elongate cylinders or cylindrical tubes having an outer diameter of about 2.5 millimeters or less, such as about 2 millimeters or less. In contemplated embodiments, the buffer tubes 126 may even be narrower, such as having an outer diameter of about 1.6 millimeters±0.2 millimeters. Further, the buffer tubes 126 may have a wall thickness of 0.5 millimeters or less, such as 0.4 millimeters or less. In other embodiments, the buffer tubes 126 may be otherwise shaped and/or otherwise sized.

According to an exemplary embodiment, the base layer 116 of the jacket 114 is formed from a first composition, which may include a polymer, such as polyethylene, or other polymers, such as polyvinyl chloride or low-smoke-zero-halogen polymers, or another material. The surface layer 118 is formed from a second composition that differs from the first composition. In some such embodiments, the second composition also generally includes the polymer of the first composition, however the polymer may be in a different form, such as not foamed and/or a higher-density version, such as high-density polyethylene in the second composition versus medium- or low-density polyethylene in the first composition. Polyethylene of the first composition may be a recycled-polyethylene, while the polyethylene of the second composition may be virgin-polyethylene. In some embodiments, polyethylene of the first composition may be a virgin-polyethylene, without additives such as colorants and ultra-violet light blocking material, while the polyethylene of the second composition may be colored and/or otherwise enhanced with additives. Limiting such additives to the surface layer 118 may help reduce waste of such additives in portions of the jacket 114 where they may be unnecessary, such as ultra-violet blocking additives (e.g., carbon black) deep within the jacket 114 where ultra-violet light penetration may not be a concern because the ultra-violet light has already been blocked by ultra-violet blocking additives closer to the surface of the jacket 114.

According to an exemplary embodiment the surface and base layers 118, 116 overlay/underlay one another. The interface between the surface and base layers 118, 116 bonds (e.g., cohesively, adhesively) the surface and base layers 118, 116 to one another. In some embodiments, the bond is at least in part due to molecular chain entanglement of the polymer of the first and second compositions. The bond may be formed or facilitated by co-extruding the surface and base layers 118, 116, by activating (e.g., via plasma- or flame-treatment) the base layer 116 and then extruding the surface layer 118 over the base layer 116, or by other processes. According to an exemplary embodiment, the bond between the base and surface layers 116, 118 at the interface 120 is at least half as great as the internal tear strength of either the first or second composition, such as at least 75% as great, or even almost as great, in some embodiments, such that attempts to pull the surface layer 118 apart from the base layer 116 may tear the respective layer(s) 116, 118.

In some embodiments, the polymer common to the surface and base layers 118, 116 is polyethylene, and the polyethylene of the second composition, used with the surface layer 118, has a higher density than polyethylene of the first composition. In some such embodiments, the density of the polyethylene of the second composition is in the range of about 0.93 to 0.97 g/cm$^3$ and the density of the polyethylene of the first composition is less than 0.94 g/cm$^3$, such as in the range of about 0.91 to 0.94 g/cm$^3$. In other contemplated embodiments, the same type of polyethylene is used for the first and second compositions, and the compositions differ from one another due to differences in other constituents, such as the presence of carbon black in the second composition but not in the first composition, or other differences as disclosed herein.

According to an exemplary embodiment, paracrystalline carbon may be added to the second composition (e.g., only to the second and not the first composition), which may serve to block ultra-violet light from penetrating the surface layer 118. In some such embodiments, the paracrystalline carbon includes (e.g., primarily consists of, is) carbon black. The carbon black may have a particle size of at least 20 and/or no greater than 350 nanometers and a tensile strength of at least 9 MPa and/or no greater than 26 MPa. The concentration of carbon black in the second composition in such embodiments may be at least 2% by volume, such as at least 2.2%, such as 2.5%±0.2% and/or at least 2.4%, while the base layer has a lesser concentration of carbon black, such as less than 2%, less than 1%, less than 0.5%, less than 0.2%, or possibly even essentially zero carbon black.

According to an exemplary embodiment, the surface layer 118 has a thickness of at least 300 micrometers and the carbon black is well dispersed. The surface layer 118 may have a thickness less than 1 mm.

In some embodiments, the base layer 116 serves as a cushion or stress absorber to the cable 110, providing compressibility to the jacket 114, such as through the addition of micro-scale gaseous voids in the base layer 116 (e.g., foam) that may not be present in the surface layer 118. For example, the surface layer 118 may be formed from a material, such as high-density polyethylene, which may have generally high stiffness. However, the base layer 116 may be formed from a foamed medium- or low-density polyethylene, which may flex and compress beneath the surface layer 118, facilitating flexibility and compressibility of the respective jacket 114. According to an exemplary embodiment, non-gaseous material of the base layer 116 may include (e.g., primarily consist of, consist of at least 50% by weight) recycled polyethylene, natural polyethylene, virgin polyethylene, and/or may have lower carbon black concentration than the surface layer 118, such as essentially no carbon black, and/or may be a medium- or low-density polyethylene.

In some such embodiments, the first composition of the base layer is heavily foamed, having gaseous voids of at least 20% by volume thereof, such as at least 30%, or even at least 35%, such as when the cable 110 is straight and resting on a generally flat surface (i.e., not being actively compressed) at sea level at room temperature (e.g., about 23° C.). The voids of the first composition may be air or another gas. For example, a chemical foaming agent may be used to foam the material of the base layer, such as azodicarbonamide, the thermal decomposition of which produces nitrogen, carbon monoxide, carbon dioxide, and ammonia gases, which are trapped in the material of the base layer as bubbles or voids. This chemical foaming agent may be pre-blended or compounded with the material of the base layer 116, prior to extrusion. The second composition may have substantially less foam, such as less than 10% gaseous voids by volume thereof, less than 5%, or even essentially zero.

The foam of the first composition may improve the compressibility of the base layer 116 and the overall jacket 114. For example, according to an exemplary embodiment, when the cable 110 is loaded in compression between two generally parallel plates with a compressive load of about 220 N/cm length for 1 minute, such as according to Telecordia GR-20 test procedures/conditions (incorporated by reference herein), the change in minimum cross-sectional diameters of the buffer tubes 126, on average, is less than 25% of their pre-loaded diameter; and/or when the cable 110 is loaded in compression between two generally parallel plates with a compressive load of about 110 N/cm length for 10 minute, such as according to Telecordia GR-20 test procedures/conditions, the change in minimum cross-sectional diameters of the buffer tubes 126, on average, is less than 25% of their pre-loaded diameter. Accordingly, in some embodiments, the cable is configured to be installed around a standard 2- to 6-inch sheave. In some contemplated embodiments, the base layer 116 is not foamed.

The surface layer 118 may be co-extruded or otherwise extruded onto a base layer 116, which may have a substantially lower concentration of carbon black (e.g., a fifth, a tenth, a hundredth the percentage) and/or a lower modulus of elasticity (e.g., at least 10%, 20%, 25% lower) than the surface layer 118. The magnitude of modulus of elasticity reduction due to foaming may be significant. For example, the surface layer 118 may have a Young's modulus of about 0.8 GPa (e.g., 0.8±0.2 GPa), while the modulus of the base layer 116 may be 0.2 GPa or less.

The surface and base layers 118, 116 may exhibit excellent adhesion at their interface and act as one jacket while each layer 118, 116 provides complementary properties to the other. The surface layer 118 may contain commercially-available additives to achieve lower friction, increased wettability, improved weathering performance, and/or for termite or rodent resistance; where some or all of these additives are not present in the base layer 116. Further, the base layer 116 may use a lower cost polyethylene such as recycled polyethylene or natural polyethylene, or may bring added performance to the cable 110 such as via higher elasticity obtained with a different grade of polyethylene or other polymer and/or foaming In one or more embodiments, linear low density polyethylene, as may be used in the first composition of the base layer 116, has excellent flexibility, better than some types of medium-density polyethylene, less shrinkage than some types of medium-density polyethylene or high-density polyethylene because it has less crystallinity and may have a lesser propensity for stress cracking. However linear low density polyethylene may have a higher coefficient of friction and a lower modulus compared to high-density polyethylene. Medium-density polyethylene is generally more expensive than low-density polyethylene and high-density polyethylene, especially in a fully carbon black compounded version. The greater density of high-density polyethylene, as may be used with the surface layer 118 in some embodiments, may result in mechanical properties that may be superior to some other types of polyethylene. For example, high-density polyethylene may be stronger and have lower friction that medium-density polyethylene or low-density polyethylene, which may be useful when moving the respective cable 110 through a duct or other narrow space. For example, the base layer 116 may define an interior surface (e.g., cavity) of the fiber optic cable 110, and the exterior surface of the jacket 114, defined by the surface layer 118, may have at least 0.1 less static coefficient of friction than the interior surface, such as at least 0.2 less. The base layer 116 of linear low-density polyethylene and/or foamed polyethylene provides cushioning and flexibility, while a surface layer 118 of high-density polyethylene provides the high mechanical strength and low friction. The base layer 116 may be foamed to absorb crush deformation of the cable 110, such as being heavily foamed, as discussed above, so as to act as a stress isolation layer against crush and impact forces, while the surface layer 118 may provide crack resistance.

These synergistic effects are enhanced because the surface layer 118 is fully bonded to the base layer 116 in some embodiments. Specifically, Applicants believe that the interface between surface and base layers 118, 116 has excellent adhesion due to the molecular entanglements of the polyethylene branches, such as may occur during co-extrusion of the respective layers. Accordingly, co-extrusion may provide better bonding than other extrusion techniques, such as sequential runs through a single extruder or use of tandem extruders, however such other extrusion techniques are contemplated for alternative process embodiments, such as where additional process steps may be included, such as a step of treating the surface of the base layer 116 with flame or plasma to activate the base layer 116 for bonding of the surface layer 118, which is then extruded thereover in a second pass through the extruder or via a second of tandem extruders.

According to alternative contemplated embodiments, one or both of the surface and base layers 118, 116 of the jacket 114 may be or include a natural polyethylene grade mixed with a carbon black masterbatch. In some contemplated embodiments, one or both of the surface and base layers 118, 116 may be or include a cross-linked polyethylene. Organic fillers, flame-retardant fillers, or additives such as charring agents may be compounded into the surface layer 118 and/or the base layer 116, such as to increase the flame retardant properties of the jacket 114 and/or to provide a charring cover that may protect a more flammable core 112. Organic fillers, that may be included in either the first or second composition, may include fibers of flame retardant polymers. Inorganic flame-retardant fillers, such as aluminum hydroxide or magnesium hydroxide, may be attached to the jacket matrix/blend material or other constituents with organosiloxanes.

Ultraviolet light protection to the fiber optic cable 110 afforded by carbon black in the surface layer 118 may be directly related to dispersion of the carbon black. A high degree of dispersion with little agglomeration helps the carbon black to work effectively. Two common ways to characterize dispersion of carbon black in the surface layer are the visual test of British Standard 2782: Methods 828A and B and the ultraviolet light absorption technique of ASTM D 3349, both of which are incorporated by reference. With the visual test, in some embodiments, carbon black of the surface layer 118 at least has an average rating of 3 with no streaking observed. The ultraviolet light absorption technique quantitatively defines the absorption efficiency of the carbon black in a sample. Like the visual test, a thin film of the material from the jacket 114 is pressed or a sample is microtomed. Then, the absorption coefficient at 375 nanometer wavelength is calculated. ASTM D3349 provides the respective equation. Some embodiments of the surface layer 118 have an absorption coefficient of at least 150, such as at least 300 or greater.

Technology disclosed herein provides a jacket 114 for a fiber optic cable 110 with a composite structure than may be made in one pass. The composite structure allows synergistic combination of the characteristics of each layer, while use of the common polymer provides highly bonded layers. The jackets 114 disclosed herein may exhibit long term mechanical performance and durability in outdoor environments generally achieved with carbon black content in the surface layer 118 and good cable compression absorption and stress isolation of the optical fibers 124 achieved with the base layer 116.

Referring once more to FIG. 1, the fiber optic cable 110 may include a bedding compound 128 or material applied around and/or within the core 112, such as filling interstices 130 between buffer tubes 126. In some embodiments, the bedding compound 128 may be a thermoplastic adhesive, such as a hot-melt adhesive. For example, in contemplated embodiments a web of hot-melt adhesive may be applied around the buffer tubes 126 individually in order to increase coupling of the buffer tubes 126 to one another and the central strength member 120. In such an embodiment, some of the interstices 130 may not be filled with the bedding compound. In some embodiments, the bedding compound 128 can be flame retardant, such as products sold by Melos GmbH in Germany, where the surface layer 118 includes a low-smoke-zero-halogen material or polyvinyl chloride and the base layer 116 includes a foamed version of the same material. In addition to flame-retardant elements, the bedding compound 128 may also serve as a water-blocking element, similar to gel or filling compounds. Different commercially-available flame-retardant elements (e.g., mica tape, aluminum tape) and water-blocking elements (e.g., water-swellable tapes and yarns, super-absorbent polymer) are also contemplated for use with the core 112 of the cable 110 as well.

According to an exemplary embodiment, the fiber optic cable 110 further includes a binding layer 132, instead of conventional binder yarns. The binding layer 132 may be formed as a continuous tube that constricts around the core 112 and holds the components of the core in place. Binder films and methods for manufacturing binder films are disclosed in U.S. Pat. No. 8,620,124. The binding layer 132 may facilitate use of non-solid bedding compound by containing the bedding component. According to an exemplary embodiment, the binding layer is particularly thin, having an average thickness of 0.5 mm or less, such as 0.25 mm or less, or even about 0.2 mm. The base layer 116 may have an average thickness that is at least twice that of the binding layer 132 and/or the surface layer 118.

According to an exemplary embodiment, the binding layer 132 is formed from a material that includes a polymer that is compatible with a polymer of the base layer 116, such as a polymer that is also present in the base layer 116 so that the binding layer 132 and base layer bond to one another when the base layer 116 is extruded over the binding layer 132. In some such embodiments, the binding layer 132 includes or primarily consists of (e.g., greater than 50% by volume) polyethylene, such as linear low-density polyethylene. The binding layer 132 may have the same composition as the base layer 116, but without being foamed. In other embodiments, the binding layer 132 may be designed to be incompatible with the base layer 116, such as a polypropylene binding layer 132 and foamed polyethylene base layer 116. In other embodiments, binding elements other than layers or films are used, such as binder yarns and/or the core 112 does not require binding and no binding element is used.

In some embodiments, the binding layer 132 has a concave shape over interstices 128, such as between buffer tubes 126 in the core 112. When the cable 110 is exposed to external transverse loads, foamed material of the base layer 116 may then be compressed into the interstices 128, which may provide additional support to the adjacent core components.

Although shown as loose tube cable 110, other types of cables may benefit from the jacket technology disclosed herein. For example, ribbon cable, drop cable, indoor cable, and other types of cables may include jackets having synergistic structural configurations as disclosed herein. Further, optical fibers disclosed herein may be single mode, multimode, multicore, ribbons, plastic, or other types or configurations of optical fibers. The optical fibers 124 may include a glass core and cladding surrounded by polymeric coating(s), resulting in an outer diameter of about 250 micrometers (e.g., 250 micrometers±25 micrometers), about 200 micrometers (e.g., 200 micrometers±25 micrometers), or otherwise sized. In some embodiments, the core 112 of the cable 110 includes additional components, such as one or more ripcords, water-blocking components, additional strength members, etc. The cable 110 may include armor, such as corrugated metal armor, between the jacket 114 and the core 112 for additional stress isolation and improved crush resistance. Cables using the technology disclosed herein may include conductive components.

The construction and arrangements of the cable and jackets, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable, comprising:
   a core comprising:
      at least one optical fiber; and
      one or more of the following: a tubular element, a binding element, a strength element, a water-blocking element, a flame-retardant element, and an additional optical fiber;
   a jacket surrounding the core, the jacket comprising:
      a base layer formed from a first composition, wherein the first composition is a foamed material comprising a polymer;
      a surface layer formed from a second composition that differs from the first composition, wherein the second composition comprises the polymer; and
      an interface between the surface and base layers, the interface cohesively bonding the surface and base layers to one another at least in part due to molecular chain entanglement of the polymer of both the first and second compositions at the interface.

2. The cable of claim 1, wherein at least 20% by volume of the foamed material consists of gas-filled voids when the cable is uncompressed at sea level at about 23° C.

3. The cable of claim 2, wherein the second composition is substantially not foamed, having less than 5% by volume thereof consisting of gas-filled voids.

4. The cable of claim 2, wherein when loaded in compression between two generally parallel plates with a compressive load of about 220 N/cm length over a 10 cm section of the cable for 1 minute, the change in minimum cross-sectional diameters of the buffer tubes in the section, on average, is less than 25% of their pre-loaded diameter.

5. The cable of claim 2, wherein when loaded in compression between two generally parallel plates with a compressive load of about 110 N/cm length over a 10 cm section of the cable for 10 minute, the change in minimum cross-sectional diameters of the buffer tubes in the section, on average, is less than 25% of their pre-loaded diameter.

6. The cable of claim 1, wherein the polymer is polyethylene and, more specifically, wherein the second composition comprises a higher density polyethylene than the first composition.

7. The cable of claim 6, wherein the density of the polyethylene of the second composition is in the range of about 0.93 to 0.97 g/cm3 and the density of the polyethylene of the first composition is 0.94 g/cm3 or less.

8. The cable of claim 6, wherein the cohesive bond between the base and surface layers at the interface is at least half as great as the internal tear strength of either the first or second composition.

9. The cable of claim 6, wherein the polyethylene of the base layer is recycled- or uncolored, natural-polyethylene.

10. The cable of claim 9, wherein the polyethylene of the surface layer is colored virgin-polyethylene.

11. The cable of claim 1, wherein the surface layer is thinner than the base layer, and wherein the surface layer has a thickness of at least about 300 micrometers.

12. The cable of claim 11, wherein the second composition further comprises one or more additives comprising paracrystalline carbon, and wherein the second composition has a percentage by volume of the paracrystalline carbon that is at least ten times greater than the percentage by volume thereof in the first composition, whereby the paracrystalline carbon is concentrated in the surface layer.

13. The cable of claim 11, wherein the paracrystalline carbon comprises carbon black having a particle size of between 20 and 350 nanometers and a tensile strength of between 9 and 26 MPa, thereby limiting penetration of ultra-violet light through the surface layer.

14. The cable of claim 13, wherein the concentration of the carbon black is at least 2% by volume in the surface layer, and the base layer has a concentration of carbon black that is 0.2% or less.

15. The cable of claim 1, wherein the core comprises the strength element, wherein the strength element comprises a central strength member, wherein the central strength member is dielectric, wherein the central strength member is a rod, wherein the rod comprises glass-reinforced plastic; the core of the fiber optic cable further comprising buffer tubes wound around the central strength member in a pattern of reverse-oscillatory stranding; wherein the at least one optical fiber comprises a plurality of optical fibers, and wherein the plurality of optical fibers extend through the buffer tubes.

16. A fiber optic cable, comprising:
a core comprising:
   a strength element, wherein the strength element comprises a central strength member, wherein the central strength member is dielectric, and wherein the central strength member is a rod;
   buffer tubes wound around the central strength member in a pattern of reverse-oscillatory stranding, wherein when loaded in compression between two generally parallel plates with a compressive load of about 220 N/cm length for 1 minute, the change in minimum cross-sectional diameters of the buffer tubes, on average, is less than 25% of their pre-loaded diameter;
   optical fibers extending through the buffer tubes, wherein the buffer tubes and optical fibers therein are reinforced by the strength element; and
   a bedding compound filling intersticial spaces between the buffer tubes and central strength member in the core; and
a jacket surrounding the core, the jacket comprising:
   a base layer formed from a first composition, wherein the first composition is a foamed material comprising a polymer, wherein at least 20% by volume of the foamed material of the first composition consists of gas-filled voids when the cable is uncompressed at sea level at about 23° C.;
   a surface layer defining an exterior surface of the fiber optic cable, wherein the surface layer is formed from a second composition that differs from the first composition, wherein the second composition comprises the polymer, wherein the surface layer is thinner than the base layer, and wherein the surface layer has a thickness of at least about 300 micrometers, wherein the second composition further comprises one or more additives comprising paracrystalline carbon, and wherein the second composition has a percentage by volume of the paracrystalline carbon that is greater than a percentage by volume thereof in the first composition; and
   an interface between the surface and base layers, the interface bonding the surface and base layers to one another.

17. The fiber optic cable of claim 16, wherein the bedding compound comprises a thermoplastic adhesive.

18. A fiber optic cable, comprising:
a strength element, wherein the strength element comprises a central strength member, and wherein the central strength member is a rod;
buffer tubes wound around the central strength member in a pattern of reverse-oscillatory stranding;
optical fibers extending through the buffer tubes;
a circumferentially contiguous binder layer surrounding and constricting the buffer tubes, the binder layer formed from a third composition comprising a polymer;
a base layer surrounding the binder layer and formed from a first composition that differs from the third composition, wherein the first composition is a foamed material comprising the polymer;
a surface layer surrounding the base layer and defining an exterior surface of the fiber optic cable, wherein the surface layer is formed from a second composition that differs from the first composition, wherein the second composition comprises the polymer;
a first interface between the surface and base layers, the first interface bonding the surface and base layers to one another; and
a second interface between the base and binder layers, the interface bonding the base and binder layers to one another.

19. The cable of claim 18, wherein at least 20% by volume of the foamed material of the first composition consists of gas-filled voids when the cable is uncompressed at sea level at about 23° C.

20. The cable of claim 18, wherein the polymer is polyethylene, wherein the polyethylene of the second composition is a higher-density polyethylene than the polyethylene of the first composition, and wherein the polyethylene of the second composition is also a higher-density than the polyethylene of the third composition.

* * * * *